United States Patent
Wagle et al.

(10) Patent No.: US 10,316,238 B2
(45) Date of Patent: Jun. 11, 2019

(54) NANOSILICA DISPERSION FOR THERMALLY INSULATING PACKER FLUID

(71) Applicant: Saudi Arabian Oil Company, Dhahran (SA)

(72) Inventors: Vikrant Wagle, Abqaiq (SA); Abdullah Al-Yami, Dhahran (SA); Zainab Alsaihati, Saihat (SA); Abdulaziz Alhelal, Alsha Hofuf (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 15/700,879

(22) Filed: Sep. 11, 2017

(65) Prior Publication Data

US 2019/0078010 A1    Mar. 14, 2019

(51) Int. Cl.
```
E21B 36/00      (2006.01)
C09K 8/467      (2006.01)
C09K 8/42       (2006.01)
E21B 33/14      (2006.01)
E21B 33/138     (2006.01)
```
(52) U.S. Cl.
CPC .............. *C09K 8/467* (2013.01); *C09K 8/422* (2013.01); *E21B 33/138* (2013.01); *E21B 33/14* (2013.01); *E21B 36/003* (2013.01); *C09K 2208/10* (2013.01)

(58) Field of Classification Search
None
See application file for complete search history.

(56) References Cited

U.S. PATENT DOCUMENTS

| | | |
|---|---|---|
| 2,618,570 A | 11/1952 | Blackburn |
| 3,032,499 A | 5/1958 | Brown |
| 3,435,899 A | 4/1969 | McLaughlin et al. |
| 3,642,624 A | 2/1972 | Howland et al. |
| 4,042,031 A | 8/1977 | Knapp |
| 4,482,381 A | 11/1984 | Spitz et al. |

(Continued)

FOREIGN PATENT DOCUMENTS

| | | |
|---|---|---|
| CN | 103173094 A | 6/2013 |
| CN | 104434542 A | 3/2015 |

(Continued)

OTHER PUBLICATIONS

Chu et al., "Glycidoxypropyltrimethoxysilane Modified Colloidal Silica Coatings", Materials Research Society, 1996, pp. 221-225, vol. 435, Materials Research Society.

(Continued)

*Primary Examiner* — William D Hutton, Jr.
*Assistant Examiner* — Andrew Sue-Ako
(74) *Attorney, Agent, or Firm* — Bracewell LLP; Constance G. Rhebergen; Kevin R. Tamm

(57) ABSTRACT

A method to control a heat transfer profile in a defined space, the method comprising the steps of introducing a thermally insulating packer fluid into the defined space such that the thermally insulating packer fluid forms a gelled solid and reduces a rate of heat transfer through the defined space as compared to a prior rate of heat transfer through the defined space before introducing the thermally insulating packer fluid, where the thermally insulating packer fluid comprises an acidic nanosilica dispersion and a polyamine.

11 Claims, 3 Drawing Sheets

(56) References Cited

U.S. PATENT DOCUMENTS

| | | | |
|---|---|---|---|
| 4,569,694 A | 2/1986 | Spitz et al. | |
| 5,320,171 A | 6/1994 | Laramay | |
| 5,762,141 A | 6/1998 | Hutchins et al. | |
| 5,951,910 A | 9/1999 | Skaggs et al. | |
| 6,085,839 A * | 7/2000 | Wyant | C04B 28/26 166/292 |
| 5,849,581 A1 | 2/2005 | Thompson et al. | |
| 6,849,581 B1 | 2/2005 | Thompson et al. | |
| 7,013,973 B2 | 3/2006 | Danican et al. | |
| 7,219,735 B2 | 5/2007 | Smith et al. | |
| 7,458,424 B2 | 12/2008 | Odeh et al. | |
| 7,563,750 B2 | 7/2009 | Eoff et al. | |
| 7,703,522 B2 | 4/2010 | Huang | |
| 7,759,292 B2 | 7/2010 | Eoff et al. | |
| 7,875,575 B2 | 1/2011 | Huang et al. | |
| 7,934,557 B2 | 5/2011 | Nguyen | |
| 7,954,549 B2 | 6/2011 | Lende et al. | |
| 8,053,397 B2 | 11/2011 | Huang et al. | |
| 8,071,666 B2 | 12/2011 | Barthel et al. | |
| 8,230,919 B2 | 7/2012 | Goodwin et al. | |
| 9,004,169 B2 | 4/2015 | Huang et al. | |
| 9,045,965 B2 | 6/2015 | Patil et al. | |
| 9,133,386 B2 | 9/2015 | Kumar et al. | |
| 9,499,735 B2 | 11/2016 | Vo et al. | |
| 9,649,618 B2 | 5/2017 | Wang et al. | |
| 9,708,523 B2 | 7/2017 | Allison et al. | |
| 2004/0031611 A1 | 2/2004 | Huang et al. | |
| 2005/0098315 A1 | 5/2005 | Danican et al. | |
| 2007/0167547 A1 | 7/2007 | Kulkarni et al. | |
| 2007/0238088 A1 | 10/2007 | Rubinsztajn et al. | |
| 2008/0066909 A1 | 3/2008 | Hutchins et al. | |
| 2009/0145607 A1 * | 6/2009 | Li | C09K 8/685 166/308.5 |
| 2010/0256023 A1 | 10/2010 | Pauls et al. | |
| 2011/0094746 A1 | 4/2011 | Allison et al. | |
| 2013/0153232 A1 | 6/2013 | Bobier et al. | |
| 2013/0292120 A1 | 11/2013 | Patil et al. | |
| 2014/0349894 A1 | 11/2014 | Quintero et al. | |
| 2016/0024371 A1 | 1/2016 | Vo et al. | |
| 2016/0068664 A1 | 3/2016 | Suemura et al. | |
| 2016/0199810 A1 | 7/2016 | Goeppert et al. | |
| 2016/0201433 A1 * | 7/2016 | Kalgaonkar | C04B 28/24 166/302 |
| 2016/0201443 A1 | 7/2016 | Nguyen et al. | |
| 2016/0280982 A1 | 9/2016 | Boul et al. | |
| 2016/0376490 A1 | 12/2016 | Salla et al. | |
| 2017/0009120 A1 | 1/2017 | Yang et al. | |
| 2017/0058181 A1 | 3/2017 | Frantz et al. | |
| 2018/0223152 A1 | 8/2018 | Wagle et al. | |

FOREIGN PATENT DOCUMENTS

| | | |
|---|---|---|
| CN | 105504900 A | 4/2016 |
| CN | 105600793 A | 5/2016 |
| GB | 2399364 A | 9/2004 |
| WO | 2014085770 A1 | 6/2014 |
| WO | WO2015041703 A1 | 3/2015 |
| WO | WO2016057027 A1 | 4/2016 |

OTHER PUBLICATIONS

International Search Report and Written Opinion for related PCT application PCT/US2018/049643 dated Nov. 26, 2018; pp. 1-14.

International Search Report and Written Opinion for related PCT application PCT/US2018/049821 dated Dec. 10, 2018; pp. 1-14.

International Search Report and Written Opinion for related PCT application PCT/US2018/049824 dated Dec. 10, 2018; pp. 1-14.

Ramasamy J. et al., "Two Component Lost Circelation Material for Controlling Seepage to Moderate Losses", Society of Petroleum Engineers, SPE-1881011-MS, 2017, pp. 1-10.

* cited by examiner

NANOSILICA DISPERSION FOR THERMALLY INSULATING PACKER FLUID

BACKGROUND

Field of the Disclosure

The present disclosure generally relates to controlling heat dispersion and heat loss within a wellbore or hydrocarbon-bearing formation. More specifically, embodiments of the disclosure relate to compositions of and methods for using thermally insulating packer fluids to place thermally insulating solid gels in situ.

Description of the Related Art

Various challenges are encountered during drilling and production operations of oil and gas wells. For example, during production as oil and gas rise toward the surface and cool, oil can become thick and more viscous decreasing production. Similarly, as natural gas rises toward the surface and cools, water and gas condensates can collect in a wellbore or hydrocarbon-bearing formation and decrease production. Various heating methods exist to apply heat to wellbores and formations to increase production and prevent viscosification and accumulation of water and other condensates.

Insulating packer fluids are used in subterranean operations, and the fluid is generally placed into an annulus between a first tubing and a second tubing, or the walls of a wellbore. The insulating packer fluid acts to insulate hydrocarbon fluid that may be located within the first tubing from the environment surrounding the first tubing or the second tubing to enable optimum recovery of the hydrocarbon fluid. For instance, if the surrounding environment is very cold, the insulating packer fluid protects the first fluid in the first tubing from the environment so that it can efficiently flow through the production tubing without cooling to a level hindering production. Preventing cooling is desirable because heat transfer can cause problems such as the precipitation of heavier hydrocarbons, severe reductions in flow rate, and in some cases, casing collapse.

Such fluids also can be used for similar applications involving pipelines for similar purposes, or in other words to protect a fluid located within the pipeline from the surrounding environmental conditions so that the fluid can efficiently flow through the pipeline. Insulating fluids can be used in other insulating applications as well where it is desirable to control heat transfer.

SUMMARY

The present disclosure includes aqueous based thermally insulating packer fluids having low thermal conductivity that can be used in applications requiring an insulating fluid, such as pipeline applications and subterranean applications, including for example wellbores and hydrocarbon-bearing formations. The newly-developed thermally insulating packer fluid includes green and environmentally acceptable chemistry, which incorporates acidic nanosilica dispersions and one or more activators. Silica is considered environmentally benign. Activators for use in embodiments of the disclosure include a polyamine, for example a polyethylene polyamine. Polyethylene polyamines used in the present disclosure include, for example, diethylenetriamine, ethylenediamine, tetraethylenepentamine, triethylentetramine, pentaethylenehexamine, hexaethyleneheptamine, and combinations thereof.

Beneficial insulating fluids of the present disclosure exhibit a low inherent thermal conductivity and can remain gelled or solidified to prevent, inter alia, convection currents that could carry heat away from a wellbore. Additionally, the insulating fluids in some embodiments are aqueous-based, and easy to handle and use. Moreover, in certain embodiments the fluids tolerate greater temperatures (for example, temperatures of about 240° F. or greater) for long periods of time and at optimum performance. To produce nanosilica dispersions or colloidal silica sol, one method is to remove sodium from sodium silicate via cation exchange. Without the sodium, polymerization takes place and particles begin to grow. After growth, the sol is stabilized and concentrated to the desired content.

Therefore, disclosed here is a method for placing thermal insulation in a wellbore or formation, the method including the step of: introducing a thermally insulating packer fluid into the defined space such that the thermally insulating packer fluid forms a gelled solid and reduces a rate of heat transfer through the defined space as compared to a prior rate of heat transfer through the defined space before introducing the thermally insulating packer fluid, where the thermally insulating packer fluid comprises an acidic nanosilica dispersion and a polyamine. In some embodiments of the method, the polyamine comprises a polyethylene polyamine. In certain embodiments, the step of introducing the thermally insulating packer fluid into the defined space includes the steps of separately introducing the acidic nanosilica dispersion and introducing the polyamine. Still in other embodiments, the step of introducing the thermally insulating packer fluid into the defined space includes introducing the acidic nanosilica dispersion and the polyamine together.

In certain embodiments of the method, the acidic nanosilica dispersion comprises amorphous silicon dioxide in a range of about 5 weight percentage of the total weight of the acidic nanosilica dispersion (w/w %) to about 50 w/w % of the total weight of the acidic nanosilica dispersion. In some embodiments, the acidic nanosilica dispersion comprises water in the range of about 50 w/w % to 95 w/w % of the total weight of the acidic nanosilica dispersion. Still in yet other embodiments, the step of maintaining the acidic nanosilica dispersion in the defined space for a period of time between about 0.5 hours to about 24 hours. In other embodiments, the defined space has a temperature that is at or greater than about 100° F. In certain embodiments, the defined space is selected from the group consisting of: a defined space in a wellbore, a defined space in a hydrocarbon-bearing formation, a defined space proximate a pipeline, an annulus, and combinations thereof.

Still in yet other embodiments, the reduction in the rate of heat transfer through the defined space causes heat dissipation through the defined space to take about 10 times as long as compared to heat dissipation at the prior rate of heat transfer through the defined space, where the defined space comprises water before introducing the thermally insulating packer fluid. In certain embodiments, the polyamine comprises a polyethylene polyamine selected from the group consisting of: diethylenetriamine, ethylenediamine, tetraethylenepentamine, triethylentetramine, pentaethylenehexamine, hexaethyleneheptamine, and combinations thereof.

Further disclosed here is a solid gelled material useful for controlling the heat transfer profile through a defined space, where the solid gelled material forms by introducing an acidic nanosilica dispersion to the defined space, the acidic nanosilica dispersion including amorphous silicon dioxide in the range of about 5 weight percentage of the total weight (w/w %) of the acidic nanosilica dispersion to about 50 w/w % of the total weight of the acidic nanosilica dispersion; water in the range of 50 w/w % to 95 w/w % of the total weight of the acidic nanosilica dispersion; an acid; and a polyamine activator; where the acidic nanosilica dispersion forms the solid gelled material at an elevated temperature between about 100° F. and about 300° F. in the defined space.

In some embodiments of the solid gelled material, the acidic nanosilica dispersion has an initial pH that is acidic and where the acid comprises acetic acid. In other embodiments, the initial pH is between about 2 and about 4. Still in other embodiments, a volumetric ratio of the amorphous silicon dioxide, water, and acetic acid to the polyamine activator is between about 60:1 and 120:1. In certain embodiments, at least one of the acid and the polyamine activator is consumed during formation of the solid gelled material. Still in other embodiments, the polyamine comprises a polyethylene polyamine selected from the group consisting of: diethylenetriamine, ethylenediamine, tetraethylenepentamine, triethylentetramine, pentaethylenehexamine, hexaethyleneheptamine, and combinations thereof.

DETAILED DESCRIPTION

Figure 1A:
FIGS. 1A and 1B are photographs of a gelled solid formed by a mixture of an acidic nanosilica dispersion combined with a polyamine activator in accordance with an embodiment of the disclosure.

The present disclosure will now be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure include a nanosilica dispersion thermally insulating packer fluid optionally for use with pipelines, in wellbores, and in hydrocarbon-bearing formations. In some embodiments, the nanosilica dispersion may include amorphous silicon dioxide in the range of about 5 weight percentage of the total weight (w/w %) of the nanosilica dispersion to about 50 w/w %, glycerin in the range of about 3 w/w % to about 5 w/w % total weight of the nanosilica dispersion, and water in the range of about 50 w/w % to about 95 w/w % total weight of the nanosilica dispersion. It should be appreciated that other suitable nanosilica dispersions may not include glycerin. The initial viscosity of a nanosilica dispersion readily allows for easy pumping and fluid flow.

In some embodiments, the nanosilica dispersion may be an acidic nanosilica dispersion and may have a pH of less than 7 before interaction with a formation, wellbore, or other area for its placement. The nanosilica dispersion thermally insulating packer fluid may be introduced into a space or annulus in a wellbore or formation, such that the nanosilica dispersion thermally insulating packer fluid forms into a solid gelled material and alters the heat transfer profile of the location of its placement. The nanosilica dispersion thermally insulating packer fluid can be allowed to interact with a zone where heat transfer profile alteration is desired for a period of time to enable the in-situ formation of a gelled solid as a result of the interaction between the nanosilica dispersion and the location of its placement.

Embodiments of the disclosure also include a nanosilica dispersion and one or more polyamine activators. Polyamines used in the present disclosure include, for example, diethylenetriamine, ethylenediamine, tetraethylenepentamine, triethylentetramine, pentaethylenehexamine, hexaethyleneheptamine, and combinations thereof. In some embodiments, the nanosilica dispersion may include amorphous silicon dioxide in the range of about 5 w/w % to about 50 w/w %, glycerin in the range of about 3 w/w % to about 5 w/w %, and water in the range of about 50 w/w % to about 95 w/w %. Polyamine is used as a chemical activator for converting an acidic nanosilica dispersion into a gelled solid. The polyamine reacts with the acid used to stabilize the acidic nanosilica dispersion. This raises the pH of the nanosilica dispersion from acidic to alkaline, which in turn destabilizes the dispersion thereby turning it into a gelled solid. In some embodiments, either or both of the acid and polyamine are partially or fully consumed during destabilization of the dispersion to avoid damage to a wellbore or hydrocarbon-bearing formation.

In some embodiments, the nanosilica dispersion may be an acidic nanosilica dispersion and may have a pH of less than 7 before interaction with the activator. Acetic acid, for example, in addition to or alternative to other weak acids and strong acids can be used to lower the pH of a nanosilica dispersion and to stabilize the dispersion. The nanosilica dispersion and one or more polyamine activators can be introduced into a wellbore, formation, annulus or other defined or confined space, such that the nanosilica dispersion and one or more polyamine activators alter the heat transfer profile of the space. The nanosilica dispersion and one or more polyamine activators can be allowed to interact with a space for placement for a period of time to enable the in-situ formation of a gelled solid as a result of the interaction between the nanosilica dispersion and the one or more polyamine activator. The nanosilica dispersion while flowing as a fluid can quickly fill cracks and small spaces, and once formed into a gelled solid can alter the heat transfer profile of cracks and small spaces to, for example, reduce heat transfer through the cracks or small spaces.

As noted, in some embodiments, the nanosilica dispersion for use as a thermally insulating packer fluid can be an acidic nanosilica dispersion and can have a pH of less than 7 before interaction with a formation or space for placement. In some embodiments, the nanosilica dispersion includes a stabilizer of acetic acid. In some embodiments, the nanosilica dispersion has a pH in the range of about 2 to about 4 at 25° C., a specific gravity of about 1.21 (g/ml), and a viscosity of about or less than about 30 cP at 25° C. In some embodiments, the nanosilica dispersion may be obtained from Evonik Corporation of Parsippany, N.J., USA.

In some embodiments, the nanosilica dispersion for thermally insulating packer fluid can include additional materials. For example, in some embodiment the nanosilica dispersion for a thermally insulating packer fluid can include calcium carbonate particles, fibers (such as polyester fibers, polypropylene fibers, starch fibers, polyketone fibers, ceramic fibers, glass fibers or nylon fibers), mica, graphite, or combinations thereof. Additional materials for inclusion into the nanosilica dispersion can be incorporated based on the results of the heat transfer profile of the gelled solid which forms from the thermally insulating packer fluid.

In some embodiments, the nanosilica dispersion and one or more polyamine activator acting as a packer fluid for thermal insulation can be allowed to interact with a space for placement, such as a zone within a wellbore or hydrocarbon-bearing formation, for a period of time. For example, the period of time may be of sufficient duration to enable formation of a gelled solid as a result of the interaction between the nanosilica dispersion and the one or more polyamine activator causing destabilization of the dispersion. The formed gelled solid may alter the heat transfer profile in a zone of placement (for example, by entering and blocking porous and permeable paths, cracks, and fractures in a formation). In some embodiments, the interaction period may be in the range of about 0.5 hours to about 24 hours.

The nanosilica dispersion may form a gelled solid when in contact with calcium carbonate of a formation of a well, for example. Upon introduction of the nanosilica dispersion within a carbonate formation, for example, the pH of the nanosilica dispersion may increase (due to reaction of an acid of the dispersion with the carbonate formation) and become alkaline by an increase in pH. Additionally, the delayed and controlled gelling of the nanosilica dispersion for use as a thermally insulating packer fluid may provide for easier pumping of the nanosilica dispersion for use as a thermally insulating packer fluid. The nanosilica dispersion for use as a thermally insulating packer fluid may be used at elevated temperatures in a wellbore such as, for example, 100° F. or greater, such as 300° F., or any temperature in between or thereabouts. Moreover, the environmentally friendly properties of the nanosilica dispersion for use as a thermally insulating packer fluid can minimize or prevent any environmental impact and effect on ecosystems, habitats, population, crops, and plants at or surrounding the drilling site where the acidic nanosilica dispersion is used.

In some embodiments, the volumetric ratio of the nanosilica dispersion to the one or more polyamine activator is between about 60:1 to about 120:1. In other embodiments, the concentration of the polyamine activator is between about 0.25% by volume and about 10% by volume of the volume of the nanosilica dispersion, or between about 1% by volume and about 5% by volume of the volume of the nanosilica dispersion. The one or more polyamine activator can increase the rate of gelation of the nanosilica dispersion as compared to using the nanosilica dispersion alone as a thermally insulating packer fluid. In some embodiments, the gelling of the nanosilica dispersion may be controlled by varying the concentration of the one or more polyamine activator, and the gelling may be controlled by changing the pH of the nanosilica dispersion for use as a thermally insulating packer fluid. For example, increasing concentrations of the one or more polyamine activator may increase the pH of the nanosilica dispersion and increase the rate of gelation of the nanosilica dispersion for use as a thermally insulating packer fluid.

Additionally, the one or more polyamine activator exhibits no precipitation with the nanosilica dispersion at elevated temperatures, thus enabling use of the nanosilica dispersion composition as a single fluid pill (that is, without staged mixing of each component). Consequently, the delayed and controlled gelling of the nanosilica dispersion for use as a thermally insulating packer fluid can provide for easier pumping downhole. The nanosilica dispersion and one or more polyamine activator can be applied at elevated temperatures in a wellbore such as, for example, 100° F. or greater, such as 300° F. Moreover, the environmentally friendly properties of the nanosilica dispersion and one or more polyamine activator can minimize or prevent any environmental impact and effect on ecosystems, habitats, population, crops, and plants at or surrounding the drilling site where the nanosilica dispersion and polyamine activator is used as a thermally insulating packer fluid.

In some embodiments, the nanosilica dispersion treatment fluid may be introduced into a treatment zone in a well, such as during a well treatment operation. For example, the nanosilica dispersion treatment fluid may be pumped through a wellhead at a pump rate sufficient to position the well treatment fluid at the treatment zone. In some embodiments, the nanosilica dispersion treatment fluid may be introduced using coiled tubing, and can be introduced into an annulus.

In other embodiments, the nanosilica dispersion treatment fluid may be used in producing wells or injection wells. For example, the treatment zone may be a zone in a producing well. In some embodiments, the nanosilica dispersion treatment fluid may be used in combination with secondary and tertiary flooding operations, such as water flooding. For example, the nanosilica dispersion treatment fluid may be used to reduce heat loss in wellbore operations where water flooding is used, or where there is other potential for heat loss.

In some embodiments, the nanosilica dispersion treatment fluid may be used with one or more additional treatment fluids. The nanosilica dispersion treatment fluid may form a gelled solid when in contact with calcium carbonate of a formation of a well, for example.

In some embodiments, the nanosilica dispersion and one or more polyamine activator may be mixed to form a treatment fluid before use in a wellbore or formation. The resulting treatment fluid may be introduced into a treatment zone in a well, such as during a well treatment operation. For example, the nanosilica dispersion and one or more polyamine activator for use as a thermally insulating packer fluid may be pumped through a wellhead at a pump rate sufficient to position the well treatment fluid at the treatment zone for altering a heat transfer profile. In some embodiments, the nanosilica dispersion and polyamine activator treatment fluid may be introduced using coiled tubing.

In some embodiments, the interaction period of the nanosilica dispersion for use as a thermally insulating packer fluid in a space for alteration of a heat transfer profile can be in the range of about 0.5 hours to about 24 hours. In some embodiments, the period may be selected based on the formation type of the treatment zone. For example, in some embodiments the interaction period for a carbonate formation may be about 8 hours for a liquid, fluid nanosilica dispersion to form a gelled solid.

Examples

The following examples are included to demonstrate embodiments of the disclosure. It should be appreciated by those of skill in the art that the techniques and compositions disclosed in the example which follows represent techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The acidic nanosilica dispersion used was IDISIL® LPH 35 manufactured by Evonik Corporation of Parsippany, N.J., USA. The properties of the nanosilica dispersion are described in Table 1:

TABLE 1

Properties of Nanosilica Dispersion.

| Nanosilica dispersion | |
|---|---|
| pH @ 25° C. | 2-4 |
| Specific Gravity (grams/milliliter (g/ml)) | 1.2 |
| Viscosity @ 25° C. (cP) | <~30 |
| Stabilizer | Acetic Acid |
| Visual Appearance | White/Off White |
| Freezing Point | 0° C. |
| Boiling point | 100° C. |
| Relative Density | 1.160-1.225 |

Figure 1B:
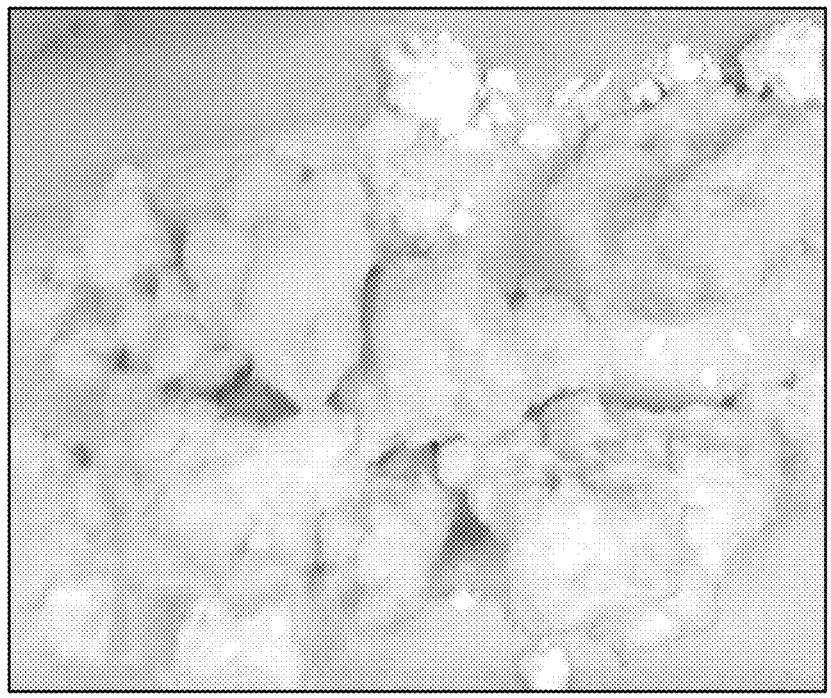
Figure 2:
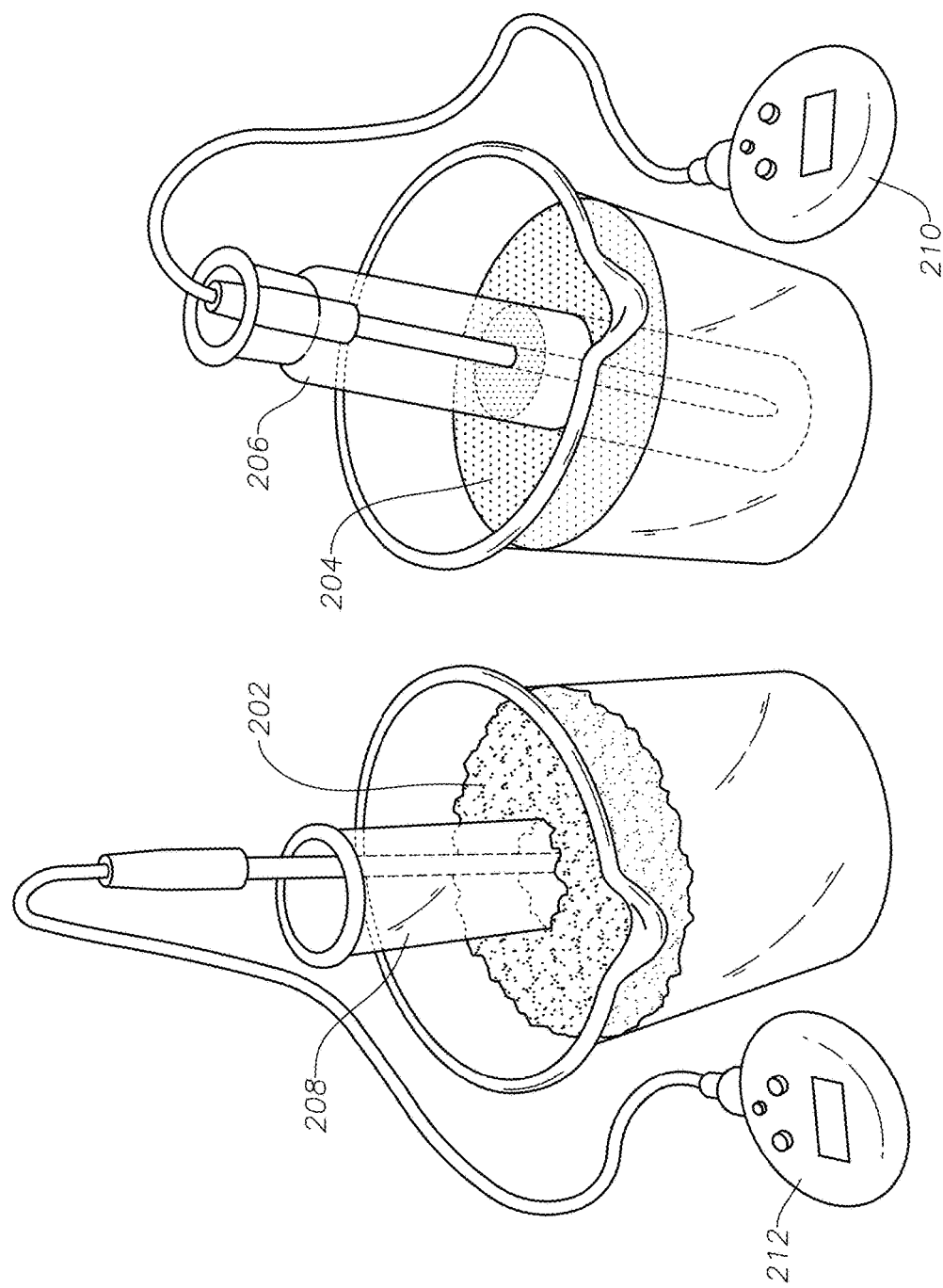
FIG. 2 is a diagram of an experiment described in this disclosure detailing the enhanced thermal insulating properties of gelled solids of the present disclosure versus water, for example.

The acidic nanosilica dispersion was a milky liquid that was completely miscible in water and had the same evaporation rate as water. Referring now to FIGS. 1A, 1B, and 2, in a first experiment, destabilization, gelling, and solidification of an acidic nanosilica dispersion using a polyamine as an activator was carried out. First, 120 ml of acidic nanosilica dispersion was placed in a beaker. The initial pH of acidic nanosilica dispersion was measured to be 3.7. Next, 1 ml of a polyamine, specifically Ethyleneamine E-100 was slowly added to the acidic nanosilica with constant stirring. The stirring was performed for 5 minutes. No gelation was observed after stirring.

Ethyleneamine E-100 is a mixture of tetraethylenepentamine (TEPA), pentaethylenehexamine (PEHA), hexaethyleneheptamine (HEHA), and greater molecular weight products. E-100 is a complex mixture of various linear, cyclic, and branched products with a number-average molecular weight of 250-300 g/mole. Ethyleneamine E-100 is produced by Huntsman Corporation of the Woodlands, Tex. The general structure of E-100 is represented by the following Formula 1:

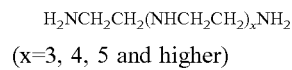

(x=3, 4, 5 and higher)

Formula 1. General Structure of E-100

The resultant pH of the nanosilica dispersion after addition of 1 ml of polyamine was measured to be 9.7. This nanosilica dispersion was then placed in a pressurized high temperature high pressure (HTHP) aging cell, and the cell was then subsequently placed in an oven and was static aged at 300° F. for about 16 hours. After 16 hours of static aging at 300° F., the nanosilica dispersion mixed with polyamine and was converted into a gelled solid, shown in FIGS. 1A and 1B. This gelled solid obtained after static aging at elevated temperature can act as an insulating packer for a hydrocarbon-bearing formation, wellbore, or pipeline and is formed from the acidic nanosilica thermally insulating packer fluid. In some embodiments, the gelling is permanent, and the gelled solid cannot be solubilized back into liquid in the space into which it is disposed. The gel produced is in the form of rigid solid.

Polyamine is used as a chemical activator for converting an acidic nanosilica dispersion into a gelled solid. The polyamine reacts with the acid used to stabilize the acidic nanosilica dispersion. This raises the pH of the nanosilica dispersion from acidic to alkaline. This destabilizes the dispersion thereby turning it into a gelled solid.

Referring now to FIG. 2, a heat transfer experiment was carried out to compare to water the heat transfer properties of the gelled solid formed from the acidic nanosilica dispersion with a polyamine activator. The thermal insulation property of the packer fluid was evaluated by performing an experiment where a comparison of the cool-down results of the gelled solid versus plain water was made (shown in FIG. 3 and discussed as follows). Experimental set-up 200 included two 400 ml glass beakers, one containing the gelled solid 202 formed from the acidic nanosilica dispersion using polyamine as an activator (as described previously), and one containing water 204.

Two measuring cylinders 206, 208 were then placed in each of the glass beakers. In one of the glass beakers, plain water 204 was placed surrounding the measuring cylinder 206 while in the other glass beaker, the gelled packer fluid 202 was placed surrounding measuring cylinder 208. As described, the gelled packer fluid used in the experiment included an acidic nanosilica dispersion gelled using polyamine as the activator. Next, 150 ml of water was disposed in a beaker and was heated up to 110° F., after which 20 ml of the hot water was poured immediately into the two measuring cylinders 206, 208. Two temperature indicators 210, 212 were then placed in each of the measuring cylinders 206, 208, respectively, and the cool-down effect was evaluated by measuring the time taken for the hot water placed in the measuring cylinders to reach 73.7° F.

Figure 3:
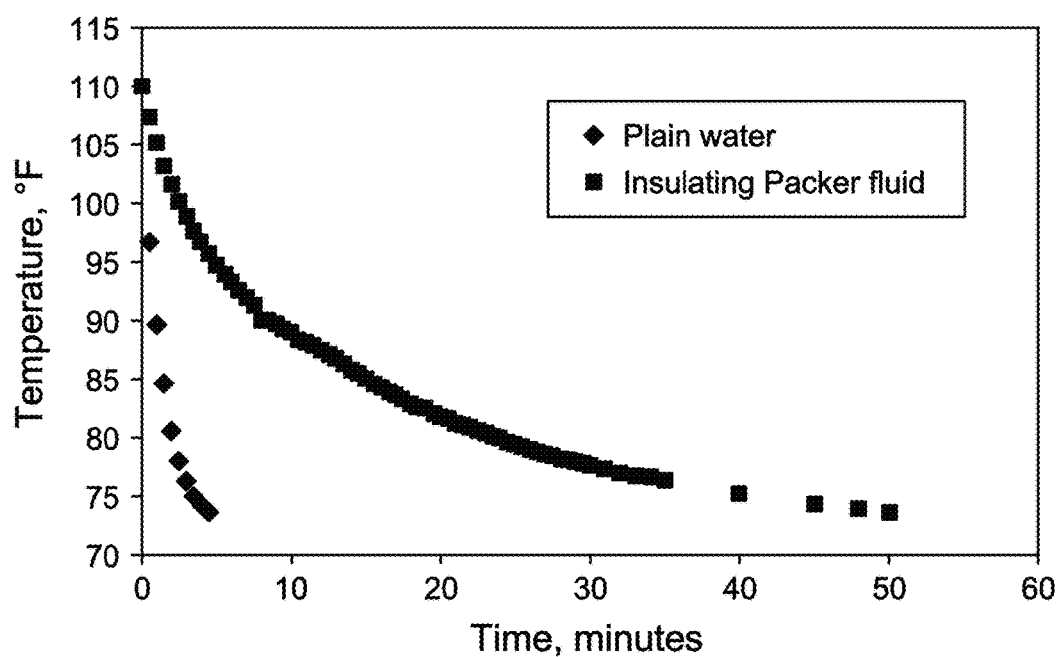
FIG. 3 is a chart showing slower heat loss for a gelled solid of the present disclosure, formed from a thermally insulating packer fluid, versus water.

Referring now to FIG. 3, the chart shows that for the gelled insulating packer fluid of the exemplified embodiment, the time required by the hot water to cool from 110° F. to 73.7° F. is about 50 minutes (min), while with plain water, the time required by hot water to cool from 110° F. to 73.7° F. is about 4.5 min. Thus the time difference of 45.5 minutes shows that the heat loss in the case of the gelled solid formed from insulating packer fluid is much less than in the case of plain water.

Some advantages of using such a combination as a thermally insulating packer fluid include: A) Utilizing network structures formed from acidic nanosilica and activators like one or more polyamine to provide a gelled solid from thermally insulating packer fluid; B) The nanosilica gelling time can be controlled by varying the concentration of the activator; C) The packer fluid utilizes environmentally friendly ingredients, as either or both of acid and polyamine are consumed during destabilization of the nanosilica dispersion; D) The gelling tendency of the system can be accelerated by changing the pH of the system from acidic to basic (in other words, the more basic the system, the faster is the gel formation); E) The activator shows no precipitation with nanosilica after mixing or at elevated temperatures (thus the composition can be pumped as a single pill); F) Delayed and controlled gelling of the fluid results in ease of pumping of the fluid; and G) Embodiments can be used at elevated temperatures.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method to control a heat transfer profile in a defined space in a subterranean operation, the method comprising the step of:
   introducing a thermally insulating packer fluid into the defined space such that the thermally insulating packer fluid forms a gelled solid and reduces a rate of heat transfer through the defined space as compared to a prior rate of heat transfer through the defined space before introducing the thermally insulating packer fluid, where the thermally insulating packer fluid comprises a nanosilica dispersion and a polyamine, where the nanosilica dispersion comprises amorphous silicon dioxide, an acidic stabilizer comprising acetic acid, and water.

2. The method of claim 1, where the polyamine comprises a polyethylene polyamine.

3. The method of claim 1, where the step of introducing the thermally insulating packer fluid into the defined space includes the steps of separately introducing the nanosilica dispersion and introducing the polyamine.

4. The method of claim 1, where the step of introducing the thermally insulating packer fluid into the defined space includes introducing the nanosilica dispersion and the polyamine together.

5. The method of claim 1, where the nanosilica dispersion comprises amorphous silicon dioxide in a range of about 5 weight percentage of the total weight of the amorphous silicon dioxide and water (w/w %) to about 50 w/w % of the total weight of the amorphous silicon dioxide and water.

6. The method of claim 5, where the nanosilica dispersion comprises water in the range of about 50 w/w % to 95 w/w % of the total weight of the amorphous silicon dioxide and water.

7. The method of claim 1, further comprising the step of maintaining the nanosilica dispersion in the defined space for a period of time between about 0.5 hours to about 24 hours.

8. The method of claim 1, where the defined space has a temperature that is at or greater than about 100° F.

9. The method of claim 1, where the defined space is selected from the group consisting of: a defined space in a wellbore, a defined space in a hydrocarbon-bearing formation, a defined space proximate a pipeline, an annulus, and combinations thereof.

10. The method of claim 1, where the reduction in the rate of heat transfer through the defined space causes heat dissipation through the defined space to take about 10 times as long as compared to heat dissipation at the prior rate of heat transfer through the defined space, where the defined space comprises water before introducing the thermally insulating packer fluid.

11. The method of claim 1, where the polyamine comprises a polyethylene polyamine selected from the group consisting of: diethylenetriamine, ethylenediamine, tetraethylenepentamine, triethylentetramine, pentaethylenehexamine, hexaethyleneheptamine, and combinations thereof.

* * * * *